United States Patent [19]
Kimblin et al.

[11] Patent Number: 5,982,593
[45] Date of Patent: Nov. 9, 1999

[54] CIRCUIT INTERRUPTER WITH TEST ACTUATOR FOR GROUND FAULT AND ARC FAULT TEST MECHANISMS

[75] Inventors: Clive W. Kimblin, Pittsburgh; Robert T. Elms, Monroeville, both of Pa.

[73] Assignee: Eaton Corporation, Cleveland, Ohio

[21] Appl. No.: 09/076,394

[22] Filed: May 12, 1998

[51] Int. Cl.⁶ .................................................. H02H 3/00
[52] U.S. Cl. ............................ 361/42; 361/102; 324/424
[58] Field of Search ................................. 361/42, 45, 93, 361/102, 115; 335/18, 21, 35; 324/424

[56] References Cited

U.S. PATENT DOCUMENTS

| | | | |
|---|---|---|---|
| 4,081,852 | 3/1978 | Coley et al. .............................. | 361/45 |
| 5,224,006 | 6/1993 | MacKenzie et al. ..................... | 361/45 |
| 5,260,676 | 11/1993 | Patel et al. ................................ | 335/18 |
| 5,293,522 | 3/1994 | Fello et al. ................................ | 335/18 |
| 5,307,230 | 4/1994 | MacKenzie ............................... | 361/96 |
| 5,459,630 | 10/1995 | MacKenzie et al. ..................... | 361/45 |
| 5,519,561 | 5/1996 | Mrenna et al. .......................... | 361/105 |
| 5,691,869 | 11/1997 | Engel et al. .............................. | 361/42 |

Primary Examiner—Michael J. Sherry
Attorney, Agent, or Firm—Martin J. Moran

[57] ABSTRACT

A miniature circuit breaker incorporating ground fault protection and arc fault protection includes a test mechanism including a ground fault test circuit for testing a ground fault detector trip mechanism, and an arc fault test circuit for testing an arc fault detector trip mechanism. A state machine circuit automatically controls the test mechanism to sequentially test both of the ground fault and arc fault detector trip mechanisms. A test push button is interconnected with the state machine circuit and, when pressed, initiates sequential testing of both of the ground fault and arc fault trip mechanisms.

17 Claims, 2 Drawing Sheets

CIRCUIT INTERRUPTER WITH TEST ACTUATOR FOR GROUND FAULT AND ARC FAULT TEST MECHANISMS

CROSS REFERENCE TO RELATED APPLICATION

This Application is related to commonly assigned, copending Application Ser. No. 09/069,355, filed Apr. 29, 1998, entitled "Circuit Breaker With Common Test Button For Ground Fault And Arc Fault Circuit" by Michael J. Whipple et al. (Attorney Docket No. 97-PDC-357).

BACKGROUND OF THE INVENTION

1. Field of the Invention

This invention relates to circuit interrupters provided with both ground fault and arc fault trip mechanisms and, more particularly, to a circuit breaker having a test actuator for enabling ground fault and arc fault tests.

2. Background Information

Circuit interrupters include, for example, circuit breakers, contactors, motor starters, motor controllers, other load controllers and receptacles having a trip mechanism. Circuit breakers are generally old and well known in the art. Examples of circuit breakers are disclosed in U.S. Pat. No. 5,260,676; and U.S. Pat. No. 5,293,522.

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal which is heated and bends in response to a persistent overcurrent condition. The bimetal, in turn, unlatches a spring powered operating mechanism which opens the separable contacts of the circuit breaker to interrupt current flow in the protected power system. An armature, which is attracted by the sizable magnetic forces generated by a short circuit or fault, also unlatches, or trips, the operating mechanism.

In many applications, the miniature circuit breaker also provides ground fault protection. Typically, an electronic circuit detects leakage of current to ground and generates a ground fault trip signal. This trip signal energizes a shunt trip solenoid, which unlatches the operating mechanism, typically through actuation of the thermal-magnetic trip device.

A common type of ground fault detection circuit is the dormant oscillator detector including first and second sensor coils. The line and neutral conductors of the protected circuit pass through the first sensor coil. The output of this coil is applied through a coupling capacitor to an operational amplifier followed by a window comparator having two reference values. A line-to-ground fault causes the magnitude of the amplified signal to exceed the magnitude of the reference values and, thus, generates a trip signal. At least the neutral conductor of the protected circuit passes through the second sensor coil. A neutral-to-ground fault couples the two detector coils which causes the amplifier to oscillate, thereby resulting in the generation of the trip signal. See, for example, U.S. Pat. No. 5,260,676; and U.S. Pat. No. 5,293,522.

Recently, there has been considerable interest in also providing protection against arc faults. Arc faults are intermittent high impedance faults which can be caused, for instance, by worn insulation between adjacent conductors, by exposed ends between broken conductors, by faulty connections, and in other situations where conducting elements are in close proximity. Because of their intermittent and high impedance nature, arc faults do not generate currents of either sufficient instantaneous magnitude or sufficient average RMS current to trip the conventional circuit interrupter. Even so, the arcs can cause damage or start a fire if they occur near combustible material. It is not practical to simply lower the pick-up currents on conventional circuit breakers, as there are many typical loads which draw similar currents and would, therefore, cause nuisance trips. Consequently, separate electrical circuits have been developed for responding to arc faults. See, for example, U.S. Pat. No. 5,224,006; and U.S. Pat. No. 5,691,869.

Ground fault protection circuits and arc fault protection circuits typically include separate associated test circuits for affirming their continued operability.

Currently, separate test switches are provided for performing the ground fault and arc fault tests. See, for example, U.S. Pat. No. 5,459,630.

For ground fault circuit interrupters (GFCIs), the UL standard mandates that the device (e.g., receptacle, circuit breaker) includes a test switch which activates ground fault protection circuitry to detect line-to-ground and neutral-to-ground faults. In turn, the user may periodically check the operation of the device, by employing the test switch to cause the separation of the separable contacts.

For arc fault circuit interrupters (AFCIs), the draft UL standard proposes testing of the arc fault detection function. Although multiple waveform tests could be achieved by multiple individual test switches, with operation of any individual test switch resulting in waveform analysis which, if successful, would cause separable contact opening, there is room for improvement.

There is also a more particular need for a circuit breaker providing ground fault and arc fault protection which has an improved mechanism for testing both the ground fault detector and the arc fault detector and, yet, can be contained in the standardized molded cases of miniature circuit breakers for use with conventional load centers.

SUMMARY OF THE INVENTION

These needs and others are satisfied by the invention which is directed to a circuit interrupter, incorporating ground fault trip and test circuits and arc fault trip and test circuits, in which a test actuator, in communication with means for automatically controlling these test circuits, initiates testing of both of the ground fault and arc fault trip circuits.

The circuit interrupter includes separable contacts mounted in a housing, an operating mechanism for opening the separable contacts when actuated, and trip means for actuating the operating mechanism in response to predetermined current conditions. The trip means includes ground fault trip means for actuating the operating mechanism in response to a ground fault, and arc fault trip means for actuating the operating mechanism in response to an arc fault. A test means includes ground fault test means for testing the ground fault trip means, and arc fault test means for testing the arc fault trip means. A means automatically controls the test means to test both of the ground fault trip means and the arc fault trip means. A test actuator communicates with the means automatically controlling the test means to initiate testing of both of the ground fault trip means and the arc fault trip means.

Preferably, the means automatically controlling the test means includes means for actuating the trip means only if both of the ground fault test means and the arc fault test means successfully test the ground fault trip means and the arc fault trip means, respectively.

The means automatically controlling the test means may include means for sequencing the ground fault test means and means for sequencing the arc fault test means.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied to a single pole miniature circuit breaker of the type commonly used in residential and light commercial applications. However, it will be evident to those skilled in the art that the invention is also applicable to other types of circuit interrupters as well.

Figure 1:
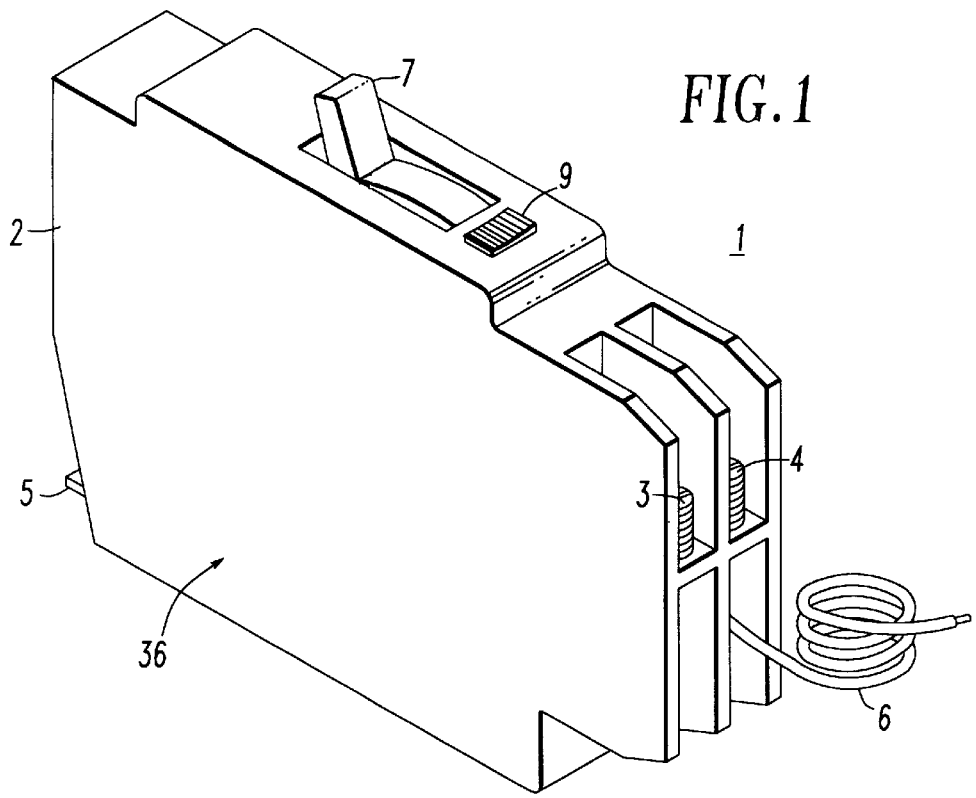
FIG. 1 is an isometric view of a circuit breaker incorporating the single test push button of the invention.

Referring to FIG. 1, the circuit breaker 1 includes a housing 2 which is assembled from a number of molded sections composed of an electrically insulating material, as is well known. Terminals 3 (load) and 4 (load neutral) are provided at one end of the housing 2 for connecting the circuit breaker 1 to a load (not shown). A stab 5 (line) and a pigtail 6 (line neutral) at the opposite end of the housing 2 connect the circuit breaker 1 to a commercial power distribution system (not shown). A molded handle 7 projects from the housing 2 for manually opening and closing the circuit breaker 1. A test push button 9 in accordance with the invention also projects from the housing 2.

Figure 2:
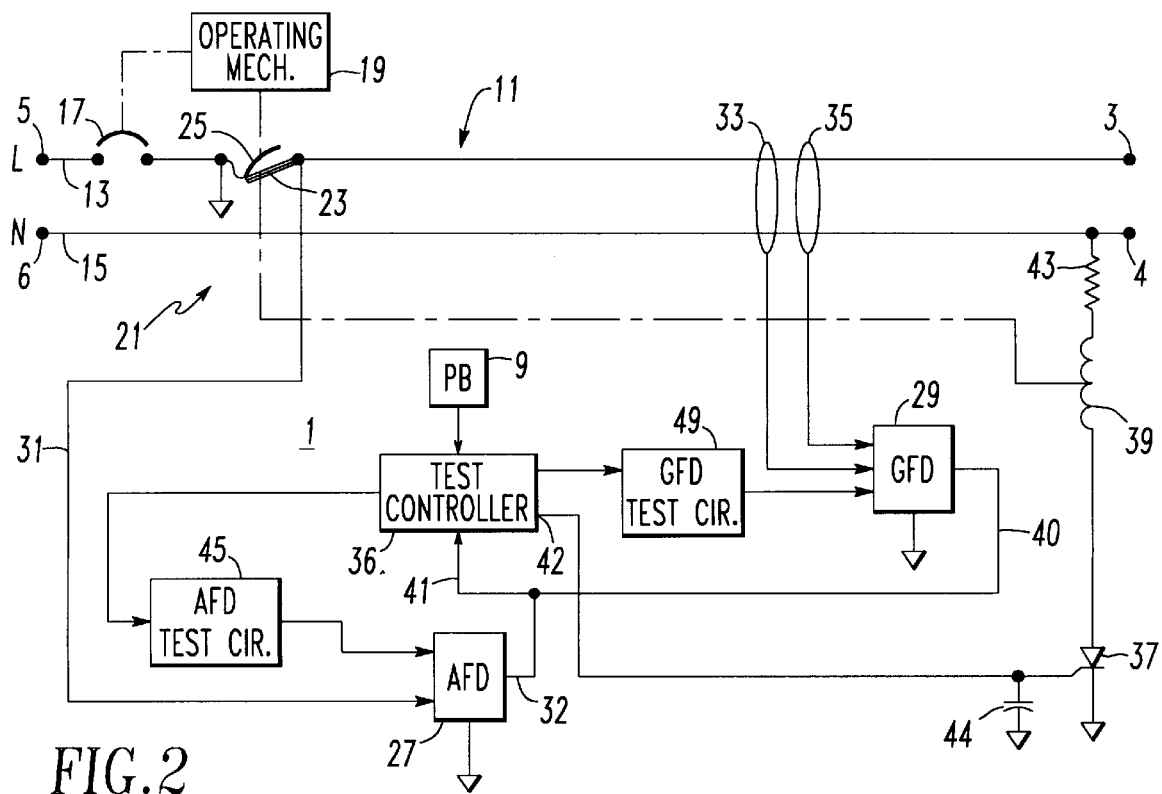
FIG. 2 is a schematic diagram of the circuit breaker of FIG. 1.

As shown in FIG. 2, the circuit breaker 1 is connected in an electric power system 11 which has a line conductor 13 and a neutral conductor 15. The circuit breaker 1 includes separable contacts 17 which are mounted in the housing 2 of FIG. 1 and connected in the line conductor 13. The separable contacts 17 are opened and closed by an operating mechanism 19. In addition to being operated manually by the handle 7 of FIG. 1, the operating mechanism 19 can also be actuated to open the separable contacts 17 by a trip assembly 21 in response to predetermined current conditions. The trip assembly 21 includes the conventional bimetal 23 which is heated by persistent overcurrents and bends to actuate the operating mechanism 19 to open the separable contacts 17. An armature 25 in the trip assembly 21 is attracted by the large magnetic force generated by very high overcurrents to also actuate the operating mechanism 19 and provide an instantaneous trip function.

The trip assembly 21 of the circuit breaker 1 is also provided with an arc fault detector (AFD) 27 and a ground fault detector (GFD) 29. The arc fault detector 27 may be, for instance, of the type which detects the step increases in current which occur each time an arc is struck, although other types of arc fault detectors could also be used. Suitable arc fault detectors are disclosed, for instance, in U.S. Pat. 5,224,006, with a preferred type described in U.S. Pat. No. 5,691,869 which is hereby incorporated by reference. The arc fault detector 27 senses the current in the electrical system 11 by monitoring the voltage across the bimetal 23 through the lead 31 to sense an arc fault current condition. As described in U.S. Pat. No. 5,691,869, the arc fault detector 27 includes circuitry which generates a pulse in response to each step change in current. The pulse signal is integrated with the result of the integration being attenuated over time. When the time attenuated accumulation of the pulses reaches a selected level, the arc fault detector 27 generates at its output an arc fault trip signal 32 which is active in response to the arc fault. In turn, the signal 32 is combined with the output signal of the ground fault detector 29 and is employed to actuate the operating mechanism 19 and open the separable contacts 17 in response to the fault.

The ground fault detector 29 may be of the well known dormant oscillator type in which case it utilizes a pair of sensing coils 33,35 to detect both line-to-ground and neutral-to-ground fault current conditions. If the arc fault detector 27 detects an arc fault in the electric power system 11, the trip signal 32 is generated which, through an exemplary test controller 36, turns on a switch such as the silicon controlled rectifier (SCR) 37 to energize a trip solenoid 39. When the ground fault detector 29 detects a ground fault, it generates at its output a ground fault trip signal 40 which is active in response to the ground fault. The ground fault trip signal 40 is "ORed" with the arc fault trip signal 32 (i.e., an "OR" function of the outputs of the ground fault detector 29 and the arc fault detector 27), such that the combination of the signals 32,40 forms a fault protection trip signal 41.

Under normal operation, the trip signal 41 passes through the test controller 36 to its output 42 to turn the SCR 37 on, energize the trip solenoid 39 and, thereby, actuate the operating mechanism 19 to open the separable contacts 17 in response to the arc fault or ground fault. A resistor 43 in series with the coil of the solenoid 39 limits the coil current and a capacitor 44 protects the gate of the SCR 37 from voltage spikes and false tripping due to noise. In this manner, either the arc fault condition or the ground fault condition results in the interruption of electrical power independent of the other.

Both the arc fault detector 27 and the ground fault detector 29 have test circuits 45 and 49, respectively. The ground fault test circuit 49 and the arc fault test circuit 45 are sequentially enabled by the exemplary test controller 36 in response to the test push button (PB) 9 for testing the ground fault detector 29 and the arc fault detector 27, respectively. Under test operation, if the ground fault detector 29 and the arc fault detector 27 are operating properly, then they generate the trip signals 40 and 32 when the associated test circuits 49 and 45, respectively, are enabled.

The ground fault test circuit 49, when enabled by the test controller 36, generates a test signal to the ground fault detector 29 to simulate a ground fault current condition by mimicking ground faults in the electrical system 11 and, thereby, testing operation of the ground fault detector 29.

The arc fault test circuit 45, when enabled by the test controller 36, provides signals to the arc fault detector 27 to simulate an arc fault current condition by mimicking arc faults in the electrical system 11 and, thereby, testing operation of the arc fault detector 27. The test circuit 45 preferably includes a low frequency relaxation oscillator and a coupling circuit for coupling a pulse signal generated by the relaxation oscillator to the arc fault detector 27.

As explained below in connection with FIGS. 3 and 4, the test controller 36 automatically controls the test circuits 49,45 to test both of the ground fault detector 29 and the arc fault detector 27. In the exemplary embodiment, whenever the user presses the push button 9, which is in communication with the test controller 36, testing of both of the detectors 29,27 is sequentially initiated. The single test push button 9 and test controller 36 test both of the ground fault and arc fault trip functions by: (1) inhibiting the trip assembly 21; (2) enabling one of the two detectors 27,29 to determine if one of the respective trip signals 32,40 was generated by the enabled detector; (3) aborting the test if that trip signal was not generated and, otherwise, continuing the test by disabling the enabled detector; and (4) delaying to allow the trip signal to be removed, enabling the trip assembly 21, and then enabling the other detector. Since, in the exemplary embodiment, the ground fault detector 29 has a non-latching trip output, this is the first enabled detector. Instead of employing individual test switches for each individual test waveform, the single test push button 9 initiates appropriate test waveforms for all of the various types of faults.

Figure 3:
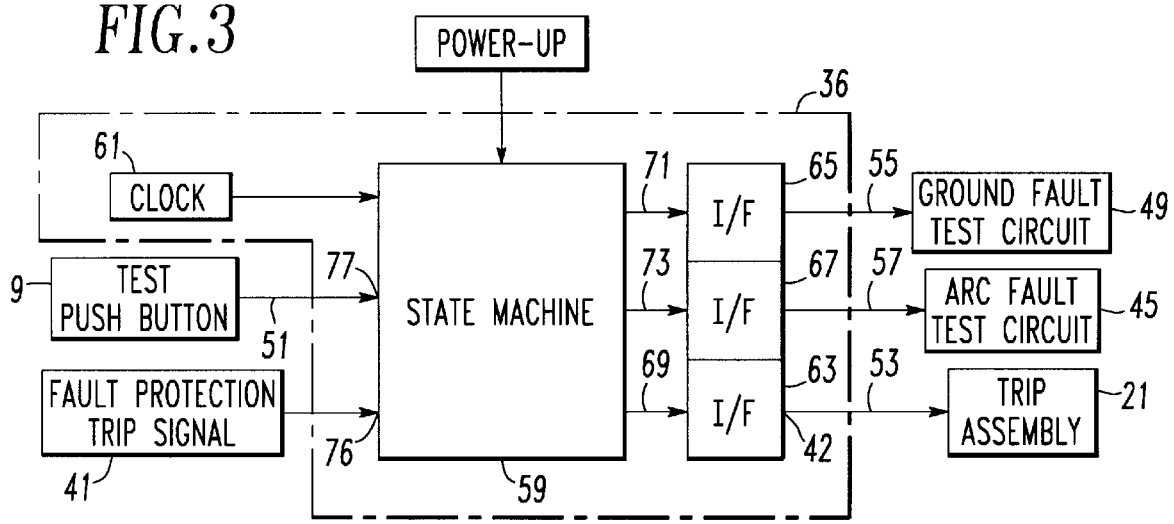
FIG. 3 is a block diagram of the test controller and associated circuits of FIG. 2.

Referring to FIG. 3, the test controller 36 and various input and output signals and circuits are illustrated. Test controller input signals include the trip signal 41 and a test signal 51, which is output by the test push button 9. Test controller output signals include a trip signal 53 at output 42, an enable signal 55 for the ground fault test circuit 49, and an enable signal 57 for the arc fault test circuit 45. The test controller 36 includes a state machine 59, a clock 61, and a plurality of suitable signal interfaces (I/F) 63,65,67 for the signals 53,55,57, respectively. Preferably, the state or machine 59 is a programmable logic array, or other equivalent digital logic known to those skilled in the art, which implements the state diagram of FIG. 4. The clock 61 provides a suitable time base (e.g., without limitation, about 0.1 second or 12 line half cycles at 60 Hz) to sequence state transitions of the state machine 59. The signal interfaces 63,65,67 provide a suitable translation of the digital logic signals 69,71,73 output by the state machine 59 to the analog (e.g., current or voltage) signals 53,55,57, respectively.

Figure 4:
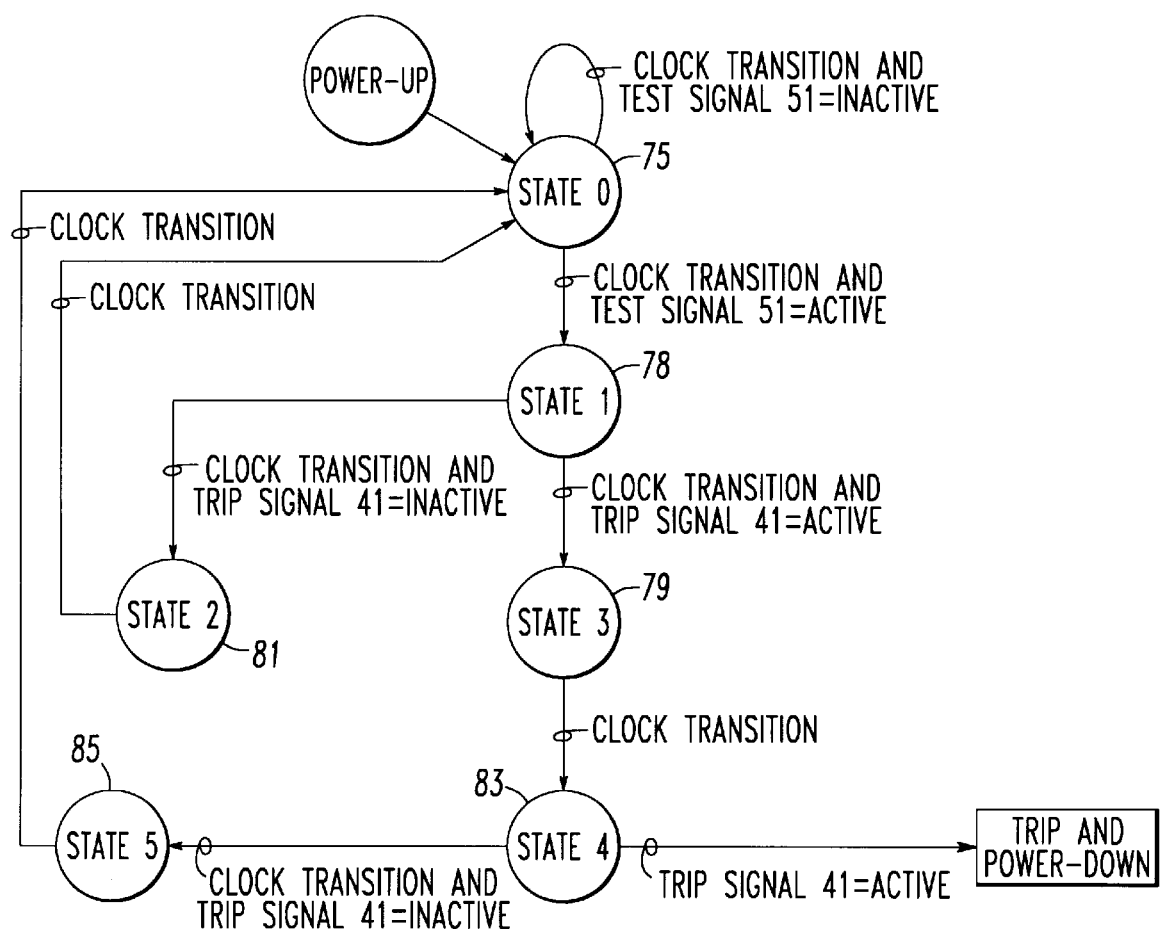
FIG. 4 is a state diagram of the state machine of FIG. 3.

FIG. 4 is a state diagram 74 of the state machine 59 of FIG. 3, in which movement between states occurs at transitions of the clock 61 and/or under certain conditions. In the normal state 75 (state 0) of the circuit breaker 1 of FIG. 2, the trip assembly 21 is enabled and the ground fault and arc fault test circuits 49,45 are disabled. In this state 75, the trip signal 41 at input 76 of state machine 59 is logically connected to the output digital logic signal 69, and the other output digital logic signals 71,73 are set false to disable the respective test circuits 49,45. At clock transitions, this state 75 is always followed by itself when the test push button 9 is not pushed and the test signal 51 at input 77 is inactive. Otherwise, if the push button 9 is pushed and the test signal 51 is active, then a state transition to the next state 78 (state 1) results after the next clock transition, and testing of both of the ground fault detector 29 and the arc fault detector 27 is initiated.

In state 78, the trip assembly 21 is disabled by setting the output digital logic signal 69 false, and one of the test circuits 49,45 is enabled by setting one of the respective digital logic signals 71,73 true. In the exemplary embodiment, for this state 78, the ground fault test circuit 49 is enabled to apply the ground fault test, although it will be appreciated that in other equivalent embodiments, the sequence of testing the detectors 29,27 may be reversed. At the next clock transition, the trip signal 41 is checked. If the output ground fault trip signal 40 of the ground fault detector 29 is active and, thus, has a value which represents successful testing of the ground fault detector 29 by the ground fault test circuit 49, then the trip signal 41 is also active and the state machine 59 advances to state 79 (state 3).

Otherwise, if the trip signal 41 is inactive at the latter clock transition, then the state machine 59 goes to state 81 (state 2). For state 81, the ground fault test circuit 49 is disabled by resetting the digital logic signal 71 false, and the trip assembly 21 is enabled by logically connecting the trip signal 41 to the output digital logic signal 69. At the next clock transition, the state machine 59 returns to state 75.

In state 79, following the successful test of the ground fault detector 29 during state 78, the ground fault test circuit 49 is disabled by resetting the digital logic signal 71 false. At the next clock transition, the state machine 59 advances to state 83 (state 4).

For state 83, following state 79, the trip assembly 21 is enabled by logically connecting the trip signal 41 to the output digital logic signal 69, and the test circuit 45 is enabled by setting the digital logic signal 73 true. Before the next clock transition, if the arc fault trip signal 32 from the arc fault detector 27 and, thus, the trip signal 41 and the output signal 69 are active, then both detector 27 and detector 29 (as successfully tested during state 78) are functional, and the circuit breaker 1 of FIG. 1 is tripped by actuating the trip assembly 21 with the active state of the trip signal 53 at output 42 of FIGS. 2 and 3. When the circuit breaker 1 trips, power to the test circuitry is removed. At power-up, the state machine 59 is initialized to state 75.

On the other hand, if the circuit breaker 1 does not trip during state 83, then at the next clock transition with the trip signal 41 being inactive, the state machine 59 goes to state 85 (state 5). In state 85, following state 83, the arc fault test circuit 45 is disabled by resetting the digital logic signal 73 false. At the next clock transition, the state machine 59 returns to state 75.

The test analysis of both detectors 29,27 is performed by the single test controller 36, and the exemplary ground fault and arc fault test waveforms are applied sequentially. In particular, the circuit breaker 1 only trips during state 83 if: (1) the simulated trip signal 40 was generated in state 78 by the ground fault test waveform; and (2) the simulated trip signal 32 was generated in state 83 by the arc fault test waveform.

Although two exemplary fault detectors 29,27, which are sequentially tested, have been disclosed, it will be appreciated that the invention is applicable to three or more fault detectors which may be tested sequentially and/or in parallel.

While the advantage of prior art multiple test switches is that each fault detector circuit may be tested with the result that the circuit interrupter is tripped in response to the particular test switch, the disadvantages are that the user must execute multiple test and reset operations and, in particular, the circuit interrupter must be equipped with multiple test switches. Better results are possible with use of the exemplary single test push button 9 and test controller 36, through which testing of the exemplary detectors 27,29 is facilitated with plural different simulated fault waveforms. Circuit breaker trip operation is caused if all simulated fault waveforms are correctly detected and analyzed. This reduces the number of test switches and, thus, increases the probability of both use and, of greater importance, proper use by the user.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A circuit interrupter comprising:

a housing;

separable contacts mounted in said housing;

an operating mechanism for opening said separable contacts when actuated;

trip means for actuating said operating mechanism in response to predetermined current conditions, said trip means including ground fault trip means for actuating said operating mechanism in response to a ground fault, and arc fault trip means for actuating said operating mechanism in response to an arc fault;

test means including ground fault test means for testing said ground fault trip means, and arc fault test means for testing said arc fault trip means;

means for automatically controlling said test means to test both of said ground fault trip means and said arc fault trip means; and a test actuator in communication with said means for automatically controlling said test means to initiate testing of both of said ground fault trip means and said arc fault trip means.

2. The circuit interrupter of claim 1 wherein said means for automatically controlling said test means includes means for actuating said trip means only if both of said ground fault test means and said arc fault test means successfully test said ground fault trip means and said arc fault trip means, respectively.

3. The circuit interrupter of claim 1 wherein said means for automatically controlling said test means includes means for sequencing said ground fault test means and means for sequencing said arc fault test means.

4. The circuit interrupter of claim 1 wherein said ground fault trip means includes ground fault sensing means for sensing a ground fault current condition; wherein said ground fault test means includes means for simulating the ground fault current condition; wherein said arc fault trip means includes arc fault sensing means for sensing an arc fault current condition; and wherein said arc fault test means includes means for simulating the arc fault current condition.

5. The circuit interrupter of claim 4 wherein said means for automatically controlling said test means includes means for sequencing said means for simulating the ground fault current condition and said means for simulating the arc fault current condition.

6. The circuit interrupter of claim 5 wherein said means for sequencing first sequences said means for simulating the ground fault current condition and then sequences said means for simulating the arc fault current condition.

7. The circuit interrupter of claim 1 wherein said ground fault trip means includes an output having a value which represents successful testing of said ground fault trip means by said ground fault test means; wherein said arc fault trip means includes an output having a value which represents successful testing of said arc fault trip means by said arc fault test means; and wherein said means for automatically controlling said test means includes input means connected to the outputs of said ground fault trip means and said arc fault trip means, and means for enabling said trip means to actuate said operating mechanism when both of said ground fault trip means and said arc fault trip means have been successfully tested.

8. The circuit interrupter of claim 7 wherein said means for automatically controlling said test means has a plurality of states including:

a zeroth state in which said test actuator is inactive and said test means is disabled;

a first state which is entered when said test actuator is active, and in which said trip means is disabled and one of said ground fault test means and said arc fault test means is enabled; and another state in which the other of said ground fault test means and said arc fault test means is enabled, and in which said trip means is actuated after both of said ground fault test means and said arc fault test means have successfully tested said ground fault trip means and said arc fault trip means, respectively.

9. The circuit interrupter of claim 8 wherein said one of said ground fault test means and said arc fault test means is said ground fault test means.

10. The circuit interrupter of claim 7 wherein said means for automatically controlling said test means has a plurality of states including:

a zeroth state in which said test actuator is inactive and said test means is disabled;

a first state which is entered from the zeroth state when said test actuator is active, and in which said trip means is disabled and one of said ground fault test means and said arc fault test means is enabled;

a second state which is entered from the first state when said one of said ground fault test means and said arc fault test means unsuccessfully tests said ground fault trip means and said arc fault trip means, respectively;

a third state which is entered from the first state when said one of said ground fault test means and said arc fault test means successfully tests said ground fault trip means and said arc fault trip means, respectively, and which disables said one of said ground fault test means and said arc fault test means;

a fourth state which is entered from the third state, in which the other of said ground fault test means and said arc fault test means is enabled, and in which said trip means is actuated when said other of said ground fault test means and said arc fault test means successfully tests said ground fault trip means and said arc fault trip means, respectively; and a fifth state which is entered from the fourth state when said other of said ground fault test means and said arc fault test means unsuccessfully tests said ground fault trip means and said arc fault trip means, respectively, and in which said other of said ground fault test means and said arc fault test means is disabled.

11. The circuit interrupter of claim 10 wherein said one of said ground fault test means and said arc fault test means is said ground fault test means.

12. The circuit interrupter of claim 10 wherein the zeroth state is entered following the second state.

13. The circuit interrupter of claim 10 wherein the zeroth state is entered following the fifth state.

14. The circuit interrupter of claim 10 wherein said trip means is enabled in the zeroth state.

15. The circuit interrupter of claim 1 wherein said test actuator has an active state, which initiates testing of both of said ground fault trip means and said arc fault trip means by said means for automatically controlling said test means, and an inactive state; wherein said ground fault trip means includes an output having a ground fault trip signal which is active in response to the ground fault; wherein said arc fault trip means has an output having an arc fault trip signal which is active in response to the arc fault; and wherein said means for automatically controlling said test means includes means for inputting the active state of said test actuator means, means for inputting the ground fault trip signal and the arc fault trip signal from the outputs of said ground fault trip means and said arc fault trip means, respectively, and means for actuating said operating mechanism.

16. The circuit interrupter of claim 1 wherein said test actuator is a push button.

17. The circuit interrupter of claim 1 wherein said circuit interrupter is a circuit breaker.

* * * * *